March 14, 1933. J. RAH 1,901,669
CABLE TERMINATOR PROVIDED WITH MEANS FOR INSULATING ENDS OF CABLE SHEATHS
Filed Feb. 8, 1930
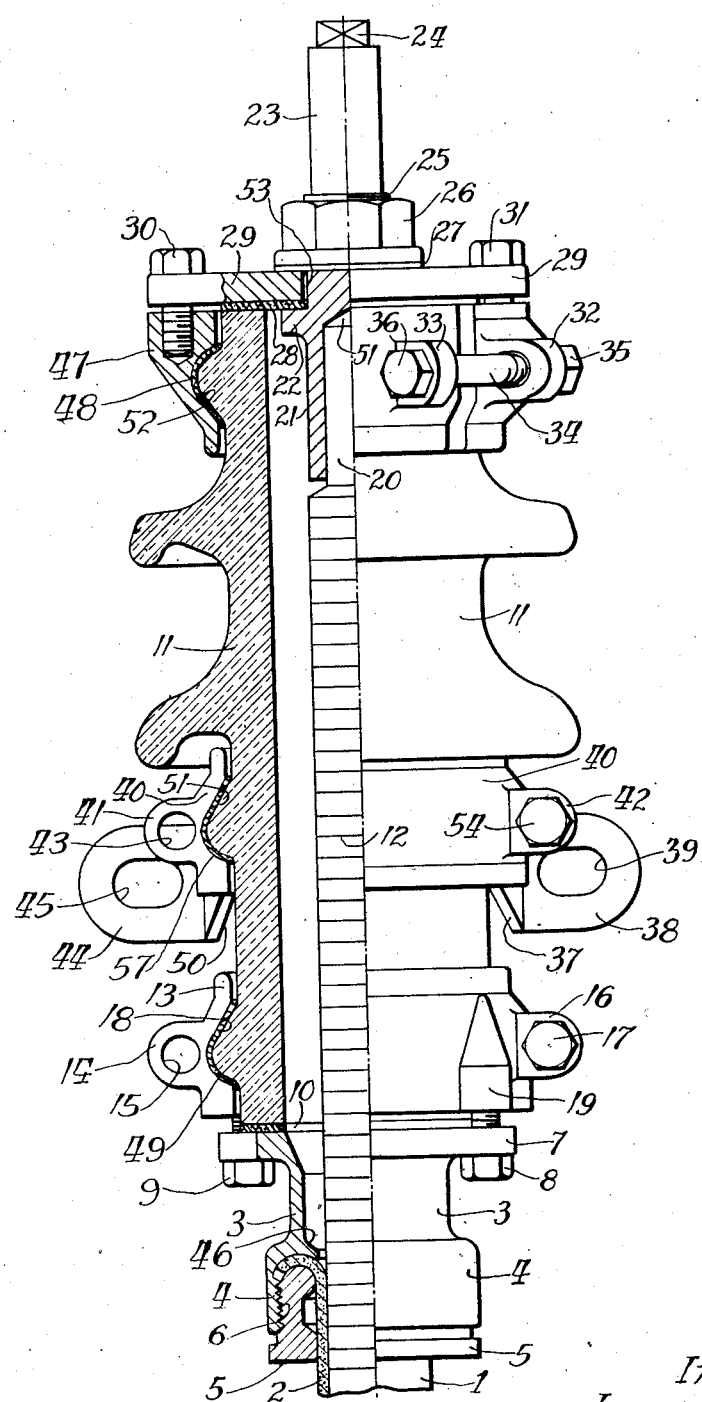
Inventor
Joseph Rah
By *signature*
Att'ys Patented Mar. 14, 1933

1,901,669

UNITED STATES PATENT OFFICE

JOSEPH RAH, OF CHICAGO, ILLINOIS, ASSIGNOR TO THE DELTA-STAR ELECTRIC COMPANY, OF CHICAGO, ILLINOIS, A CORPORATION OF ILLINOIS

CABLE TERMINATOR PROVIDED WITH MEANS FOR INSULATING ENDS OF CABLE SHEATHS

Application filed February 8, 1930. Serial No. 426,815.

This invention, generally stated, is concerned with cable terminators, and has more particularly to do with a novel and improved oil-tight terminator which is simple in construction and efficient in application and maintenance.

The name cable terminator, as used in this specification and in the claims, refers to a device for receiving the terminating end of a cable, having terminal provisions for joining the conductor of the cable to a bus bar or to another current conducting or distributing body provided in the locality in which the cable terminates. Such a cable terminator is frequently also referred to as a pot head or an end bell. However, I prefer to apply the name cable terminator to the device because it expresses more accurately the nature of the device and its function.

It is one of the objects of the present invention to provide an improved mounting for a cable terminator so that the terminator will securely support the cable while permitting of a slight adjustment of the terminator with respect to its support.

It is another object of the present invention to provide a cable terminator with means for supporting the same in an insulated relation to the cable sheath.

It is a further object of the present invention to provide an improved means for attaching a cable sheath to the terminator housing in an oil-tight relation and to provide a simplified construction which will permit easy assembly and disassembly of the device.

The attainment of the above and further objects of the present invention will be apparent from the following specification taken in conjunction with the accompanying drawing forming a part thereof.

The drawing shows a terminator, partly in plan view and partly in cross-section to facilitate explanation and understanding, with a cable entering at one end of the terminator, and terminal provisions projecting from its other end and in conductive relation with the conductor of the cable within the terminator for completing the connection to a current conducting body which may be a bus bar.

Referring now to the drawing, the terminator includes a tubular insulating casing 11 for receiving the stripped end 12 of the cable 1. This casing is provided near its ends with peripherally projecting and circularly extending protuberances 18 and 52.

A sectional or split clamp 13, conforming to the shape of the protuberance 18 is attached to the casing by means of extensions such as 14 and 16 provided on the clamp sections. Bolts such as 17 which are inserted in holes 15 in the extensions 14 and 16 are provided for fastening the clamp sections circularly to the casing 11. A layer 49, which may be of lead of any other suitable substance, is interposed between the protuberance 18 of the insulating body 11 and the sectional clamp in order to provide for a cushion effect and to insure a tight and safe grip of the clamp on the insulator body.

Attached to this split clamp 13 at the lower end of the insulator casing 11 is a sleeve member 3 having a flange 7 which is fastened to the clamp 13 by means of bolts 8 and 9. Inserted between the flange 7 and the end of the insulating body 11 is a gasket 10 for the purpose of providing an oil-tight joint between the sleeve and the casing. There are projections, such as 19, on the periphery of the sections of clamp 13 for the purpose of receiving the bolts 8 and 9 in threaded holes provided in these projections.

The neck of the sleeve 3 carries a circular extension which is co-axial with the insulating body 11, and provided internally with a circular rim 46 for receiving the end of the cable sheath 2, while the part 4 of the extension is provided with an internal thread 6. The exterior cable sheath 2 is inserted into the rim extension 46 and firmly attached thereto by means of a circular threaded member 5.

It will be appreciated that the attachment of the sheath, as described, represents many advantages over prior constructions. No soldering or hammering is necessary, as, for example, in case of a wiping sleeve having a lead skirt. The cable sheath is simply inserted into the rim extension 46 and mechanically tightened by means of the nut member 5. Readjustments are easily carried out and the cable is accessible for inspection. Strains and stresses imposed upon the assembly under ordinary conditions will be taken up by the adjustable clamps attached to the protuberance 18 on the casing 11, and by the mechanically adjustable fastening means for the cable sheath. The stresses will be equalized and the assembly will adjust itself automatically without damage to any part thereof.

If desired, the sleeve 3 for attaching the sheath of the cable to the insulator casing may, of course, be an ordinary wiping sleeve for rigid attachment to the sheath, and otherwise designed as shown, with a flange 7 for mechanical and adjustable attachment to the clamp 13 and to the casing 11.

The terminal member 23 is provided for the purpose of maintaining connection with the cable conductor 20. It may be connected to a current conducting or distributing body, such as a bus bar. An extension 21 of the terminal member 23 is provided with a hole 51 which is slightly smaller than the diameter of the cable conductor 20. The cable conductor 20 is forced into the opening 51 in the extension 21 of the terminal member 23 to insure a tight fit and reliable connection between the terminal member 23 and the cable conductor 20.

A shoulder or collar 22 projecting circularly from the lower portion of the terminal member 23, within the casing 11, is adapted to receive a gasket 28, which is also common to this end of the insulating casing 11 and engaging the same as shown in the drawing. Attached to this upper end of the insulating casing 11 is a sectional or split clamp 47 in a similar manner as the sectional clamp 13 is attached at the lower end of the casing, the clamp sections conforming to the shape of the protuberance 52. The sections of the clamp are bolted together by means of bolts such as 34 projecting through extensions 32 and 33 provided on the body of the sectional clamp, and held together by means of nuts such as 35. Again, as in the case of clamp 13, a layer 48 of a suitable material, such as lead, is inserted between the protuberance 52 on the insulating body 11 and the clamp body 47, in order to insure a cushion effect and a tight and dependable grip of the clamp on the insulating body and, at the same time, adapted to take up strains and stresses imposed upon the assembly.

The cover plate 29 is in engagement with the gasket 28 and is peripherally attached to the clamp body 47 by means of bolts such as 31 and 30, and is in oil-tight relation relative to the insulating body 11.

The terminal member 23 projects through the opening 53 in the cover plate 29. It is provided with a threaded portion 25 for receiving the nut 26. A washer 27, which may or may not be a gasket, is inserted between the nut 26 and the cover plate 29. When the nut 26 is tightened, the oil tight connection between the terminal member 23 and the insulating body 11 will be completed.

The uppermost portion of the terminal member 23, designated by reference numeral 24, is squared or provided with a hole or other suitable means for holding the terminal member 23 against turning when the nut 26 is tightened.

A clamp 40 having sections conforming to the shape of protuberance 51 may be attached to the insulating body 11 in a similar manner as was explained in connection with the clamps 13 and 47, by means of bolts, such as 54 extending through holes 43 on extensions 41 and 42 provided on the sections of the clamp 40. Again, as in case of clamps 13 and 47, a layer 57 is interposed between the clamp 40 and the protuberance 51 in order to insure a tight grip of the clamp on the casing and to provide at the same time for readjustments which might be demanded by stresses imposed upon the structure. The clamp 40 may be fastened in some convenient manner to, or may be integral with, a bracket member having extensions 37 and 50 and brackets 38 and 44 provided with holes 39 and 45 for attachment to a rack or to other mounting provisions.

The mounting of the insulating casing 11 of the terminal assembly by means of a separate clamp 40 and mounting brackets 38 and 44 is one of the novel features of the invention. It will be observed that I have, thereby, provided for mounting the assembly in such a manner as to take up strains and stresses imposed upon the same, and that the mounting is accomplished in insulated relation to the cable sheath. Therefore, currents induced in the cable sheath will not be transmitted to the mounting rack or other mounting provisions. Power loss and interference with neighboring equipment, due to induction, is avoided.

Should it be necessary to inspect the cable within the terminator, such inspection may be easily made by simply removing the nut 26 and the nut 5, and opening the mounting clamp 40, and then lifting the entire assembly off. Reassembly is equally simple since it requires only the tightening of the two nuts 5 and 26, and re-attachment of the mounting clamp 40.

In order to reduce the effect of induction, which may express itself in power loss and in disturbances to neighboring equipment to an unavoidable minimum, and particularly in order to avoid magnetic losses, I employ bronze for the clamp 47, and an alloy of iron and bronze to equal parts for the clamps 13 and 40 and for the mounting brackets 37 and 50. The sleeve member 3 with all auxiliary parts may be made of iron or of bronze, depending on the current carried by the cable.

The materials given above yield the best practical results, mechanically as well as electrically.

It will be seen from the above description and from the drawing, that I have invented a cable terminator incorporating a number of useful and novel features and improvements. Modifications may, of course, suggest themselves in the light of the knowledge conveyed by this specification, and it will be understood, therefore, that I do not want to be limited in the application of the invention to the precise structure as described and shown, but only to the scope of the following claims.

I claim:—

1. A cable terminator for receiving the end of a terminating cable having a tubular insulating casing, a split clamp secured to said casing near one end thereof, sleeve means, a flange on said sleeve means for attachment to said split clamp, a gasket interposed between said flange of said sleeve means and said casing for securing an oil-tight joint therebetween, a circular rim on said sleeve means for receiving the exterior sheath of said cable, a tubular screw means engaging said rim for holding said sheath in oil-tight relation to said rim, said tubular screw having a rounded head portion and a cylindrical guide portion and an annular internal groove axially separating said portions, terminal means for receiving the conductor of said cable at the other end of said casing, a split clamp secured to said casing at said other end thereof, a closing member cooperating with said other end of said casing and said terminal means, and a nut on said terminal means for securing said closing member in oil-tight relation relative to said other end of said casing.

2. In a device for establishing a cable connection, a hollow insulator open at both ends and having flat seating surfaces at each end, and having adjacent said seating surfaces but spaced therefrom peripheral beads formed integrally with and merging with the body of the insulator in continuous curves free of sharp corners both above and below the beads, split clamps surrounding said beads and of an internal curvature mating with said beads whereby each clamp is permitted a limited degree of angular adjustment longitudinally of the insulator along the upper and lower continuously curved surfaces merging its bead with the body of the insulator.

3. In a device for establishing a cable connection, a hollow insulator open at both ends and having flat seating surfaces at each end, and having adjacent said seating surfaces but spaced therefrom peripheral beads formed integrally with and merging with the body of the insulator in continuous curves free of sharp corners both above and below the beads, split clamps surrounding said beads and of an internal curvature mating with said beads whereby each clamp is permitted a limited degree of angular adjustment longitudinally of the insulator along the upper and lower continuously curved surfaces merging its bead with the body of the insulator, and a third peripheral bead formed on the insulator and located between the two first mentioned beads and of a shape similar thereto, and a split clamp for mounting the insulator, said last mentioned clamp being also of an internal curvature mating with said last mentioned bead whereby the insulator is permitted a limited angular adjustment with respect to its mounting clamp.

4. A cable terminator comprising an insulating sleeve, a cable having a conductor extending into said sleeve at one end thereof and through the sleeve to substantially the opposite end and spaced from the inner walls of the sleeve, a terminal member secured to the end of the conductor and extending through the sleeve, said terminal having an integral peripheral shoulder intermediate the ends thereof, a separate circular flat plate member resting on said shoulder and provided with a central opening through which the end of the terminal extends, the extended end of the terminal comprising a threaded shank, a nut threaded on the shank and forcing the plate member towards the shoulder, said plate member extending to the insulator and overlying the end thereof and constituting a closure for the space between the terminal and the insulator, a split clamp secured to the outside of the insulator by means of a ball and socket connection, and means securing the plate member to the split clamp.

5. A cable terminator for receiving the end of a terminating cable, having a tubular insulating casing, flanged sleeve means, means attached to one end of said casing for securing said flanged sleeve means in oil-tight relation to said casing, a circular rim on said sleeve means for receiving the exterior sheath of said cable, a tubular screw engaging said rim for securing said sheath in oil-tight relation to said rim, terminal means for engaging the conductor of said cable inside said casing at the other end thereof, a shoulder provided on said terminal means in alignment with said other end of said casing, a single gasket for said other end of said casing and said shoulder for sealing said other end of said casing, a closing plate positioned on said gasket, said terminal means projecting through said closing plate, means at said other end of said casing for securing said closing plate peripherally, and means on said terminal means for securing said plate centrally.

6. A cable terminator for receiving the end of a terminating cable, having a tubular insulating casing, sleeve means attached to one end of said casing in oil-tight relation thereto and provided with a circular rim for receiving the exterior sheath of said cable, movable means removably attached to said rim for receiving said sheath in oil-tight relation to said rim, terminal means for directly and rigidly receiving the conductor of said cable inside said casing, a shoulder provided on said terminal means in alignment with the other end of said casing, a gasket positioned on said shoulder and on said other end on said casing, a closing plate covering said gasket attached to said other end of said casing, said terminal means projecting exteriorly of said closing plate, and means attached to said projecting terminal for securing said closing plate in oil-tight relation relative to said other end of said casing and to said terminal.

7. A cable terminator for receiving the end of a terminating cable, having a tubular insulating casing, sleeve means attached to one end of said casing in oil-tight relation thereto, a circular rim provided on said sleeve means and disposed coaxial with said tubular casing for receiving the exterior sheath of said cable, movable means removably attached to said rim for securing said sheath to said rim in oil-tight relation thereto, terminal means projecting from the other end of said casing for directly and rigidly receiving the conductor of said cable inside said casing, a shoulder provided on said terminal means, a common gasket for said shoulder and for said other end of said casing, a single cover plate engaging said gasket, means for peripherally fastening said cover plate to said other end of said casing, and means for centrally fastening said cover plate to said terminal means.

8. A cable terminator for receiving the end of a terminating cable, having a tubular insulating casing, the inner diameter of said casing being substantially cylindrical, mechanically removable and adjustable means positioned in direct axial continuation of said casing at one end thereof for removably securing the exterior sheath of said cable to said end of said casing and in oil-tight relation thereto, terminal means for rigid attachment to the conductor of said cable inside said casing, a shoulder on said terminal means, a gasket positioned on said shoulder and said other end of said casing, a closing member engaging said gasket, and means cooperating with said terminal means for clamping said gasket between said closing member and said casing and shoulder for sealing said other end oil-tight relative to said terminal means.

9. A cable terminator for receiving the end of a terminating cable, having a tubular insulating casing, the inner diameter of said casing being substantially cylindrical, a sectional clamp embracing one end of said casing exteriorly and peripherally, means interposed between said clamp and said casing for providing a cushion effect therebetween, a sleeve member peripherally attached to said clamp in oil-tight relation relative to said end of said casing, a rim extension disposed coaxial with said casing, a tubular screw engaging said rim extension, said screw having a rounded head portion for clamping the exterior sheath of said cable to said rim and in oil-tight relation thereto, and a cylindrical guide portion for guiding said sheath, said portions being separated by an internal annular notch in said rim, terminal means for direct attachment to the conductor of said cable inside said casing and projecting therefrom, and a cover plate fastened to the other end of said casing for securing said terminal means to said other end and in oil-tight relation thereto.

10. A cable terminator for receiving the end of a terminating cable, having a tubular insulating casing, a sectional clamp embracing one end of said casing exteriorly and peripherally thereof, means interposed between said clamp and said casing for providing a cushion effect therebetween, a sleeve member attached to said clamp in oil-tight relation relative to said end of said casing, said sleeve member having a rim extension disposed coaxial with said casing, means for removably attaching the exterior sheath of said cable to said rim and in oil-tight relation thereto, terminal means for direct attachment to the conductor of said cable inside said casing and projecting therefrom, a common gasket engaging said terminal means and said other end of said casing, a closing plate positioned on said gasket for sealing said other end in oil-tight relation to said terminal means, a sectional clamp embracing the other end of said casing exteriorly and peripherally thereof, means for peripherally securing said plate to said sectional clamp, and means for centrally securing said plate to said terminal means.

11. A cable terminator for receiving the end of a terminating cable, having a tubular insulating casing, a sectional clamp embracing said casing exteriorly and peripherally at each end thereof, means interposed between each of said clamps and said casing for providing a cushion effect therebetween, a flanged sleeve member secured to one of said clamps in oil-tight relation relative to said end of said casing, a rim extension on said sleeve member disposed coaxial with said casing, means for removably attaching the exterior sheath of said cable to said rim and in oil-tight relation thereto, terminal means for direct attachment to the conductor of said cable inside said casing and projecting therefrom, a closing plate for sealing the other end of said casing, means for peripherally securing said plate to said sectional clamp at said other end of said casing in oil-tight relation to said casing, means on said projecting terminal for centrally securing said plate in oil-tight relation to said terminal means, and a sectional clamp on said casing intermediate of said other clamps thereon for mounting said terminator.

In witness whereof, I hereunto subscribe my name this 5th day of February, 1930.

JOSEPH RAH.